United States Patent [19]

Yoneyama

[11] 3,745,238

[45] July 10, 1973

[54] SIGNAL PROCESSING SYSTEM FOR MULTIPLE SIGNAL TRANSMISSION

[75] Inventor: Masahide Yoneyama, Kawasaki-shi, Japan

[73] Assignee: Nippon Columbia Kabushikikaisha Nippon Columbia Co. Ltd., Tokyo, Japan

[22] Filed: Oct. 26, 1971

[21] Appl. No.: 192,088

[52] U.S. Cl. .......... 178/5.4 ST
[51] Int. Cl. .......... H04n 9/06
[58] Field of Search .......... 178/5.4 R, 5.4 ST; 179/15 AN

[56] References Cited

UNITED STATES PATENTS

| | | | |
|---|---|---|---|
| 2,951,903 | 9/1960 | De Vrijer | 179/15 AN |
| 2,733,291 | 1/1956 | Kell | 178/5.4 ST |
| 2,884,485 | 4/1959 | Shlachter | 178/5.4 R |
| 2,901,531 | 8/1959 | McCoy et al. | 178/5.4 ST |

*Primary Examiner*—Richard Murray
*Attorney*—Carlton Hill, J. Arthur Gross et al.

[57] ABSTRACT

A signal processing system for multiple signal transmission having a first device for generating a signal with a spectrum equivalent to the frequency spectrum of a crosstalk component, and a second device for subtracting the signal from a composite signal, whereby supurious signals are removed from the composite signal.

7 Claims, 41 Drawing Figures

INVENTOR
Masahide Yoneyama

BY Hill, Sherman, Meroni, Gross & Simpson
ATTORNEY

INVENTOR
Masahide Yoneyama

BY

ATTORNEY

INVENTOR
Masahide Yoneyama

BY Hill, Sherman, Meroni, Gross & Simpson

ATTORNEY

INVENTOR
Masahide Yoneyama

BY Hill, Sherman, Meroni, Gross & Simpson
ATTORNEY

Patented July 10, 1973 3,745,238

14 Sheets-Sheet 5

INVENTOR
Masahide Yoneyama

BY Hill, Sherman, Meroni, Gross & Simpson
ATTORNEY

INVENTOR
Masahide Yoneyama
BY Hill, Sherman, Meroni, Gross & Simpson
ATTORNEY

Patented July 10, 1973 3,745,238

14 Sheets-Sheet 7

INVENTOR
Masahide Yoneyama

BY Hill, Sherman, Meroni, Gross & Simpson

ATTORNEY

INVENTOR
Masahide Yoneyama
BY Hill, Sherman, Meroni, Gross & Simpson
ATTORNEY

INVENTOR
Masahide Yoneyama
BY Hill, Sherman, Meroni, Gross & Simpson
ATTORNEY

INVENTOR
Masahide Yoneyama

BY Hill, Sherman, Meroni, Gross & Simpson

ATTORNEY

INVENTOR
Masahide Yoneyama
BY Hill, Sherman, Meroni, Gross & Simpson
ATTORNEY

INVENTOR
Masahide Yoneyama

BY Hill, Sherman, Meroni, Gross & Simpson
ATTORNEY

INVENTOR
Masahide Yoneyama
BY Hill, Sherman, Meroni, Gross & Simpson
ATTORNEY

Patented July 10, 1973 3,745,238

14 Sheets-Sheet 14

INVENTOR
Masahide Yoneyama

BY [signature]
ATTORNEY

SIGNAL PROCESSING SYSTEM FOR MULTIPLE SIGNAL TRANSMISSION

BACKGROUND OF THE INVENTION

1. Field of the Invention

This invention relates to a signal processing system for multiple signal transmission.

2. Description of the Prior Art

A conventional single-tube color camera of the frequency separation system, which has attached to the front thereof a stripe color filter, is known to employ means for optically controlling the space frequency component to remove a spurious signal based on crosstalk between two carrier color signals or between the carrier color signal and a non-carrier signal representing a luminance signal component. For this purpose, there have heretofore been proposed various methods such as picking up the image of an object being televised with the image pickup tube being defocused, attaching to the front of the image pickup tube a lenticular lens, a tourmaline, crystal or the like causing defocusing, vibrating the stripe filter and so on. However, these methods are to control the space frequency component optically and has a defect to lower the efficiency.

SUMMARY OF THE INVENTION

One object of this invention is to provide a signal processing system which eliminates an undesirable spurious signal generated at the edge portion of an object to be televised (where brightness abruptly changes).

Another object of this invention is to provide a signal processing system which produces a waveform equivalent to an output waveform of a color separating bandpass filter which is a crosstalk component between adjacent channels leading to the generation of a spurious signal and in which the waveform is subtracted from a waveform containing the spurious signal after being demodulated, thereby to eliminate the spurious signal.

Another object of this invention is to provide a signal processing system which is provided with means for removing a spurious signal which is produced by crosstalk between a non-carrier signal and a carrier signal.

Another object of this invention is to provide a signal processing system which is provided with means for removing a spurious signal caused by crosstalk between carrier signals of adjacent channels.

Another object of this invention is to provide a signal processing system which is provided with means for simultaneously removing spurious signals which are caused by crosstalk between carrier signals and between the carrier signal and a non-carrier signal.

Another object of this invention is to provide a signal processing system in which position detecting pulses are provided at the edge portions of an object to be televised where the brightness abruptly varies to remove the edge portions where spurious signals are produced and to inhibit the passage of color signals during the fluctuation period at the rising up time thereof.

Other objects, features and advantages of the present invention will be apparent from the following description taken in conjunction with the accompanying drawings.

DESCRIPTION OF THE PREFERRED EMBODIMENTS

For a better understanding of this invention a rough description will be given first of a signal processing system.

In a single-tube color camera of the frequency separation type, an optical filter is disposed in an optical system to separate an incident light from an object being televised into a luminance signal Y and red and blue color signals R and B. The optical filter is an assembly of two kinds of filter components, one filter component consisting of two kinds of strip filter elements, one inhibiting the passage therethrough of red color light, the other permitting the passage therethrough of white color light and the other filter component consisting of two kinds of strip filter elements, one inhibiting the passage therethrough of blue color light, the other permitting the passage therethrough of white color light, the pitches of the former and latter strip filter elements being different from each other. Due to a limit in the space or spatical frequency response characteristic of the optical filter from the object to the color filter including an objective lens, the space frequency spectrum of the image of the object projected on the color filter is limited and its upper limit is thereby inevitably defined. Accordingly, there is also an upper limit in the space frequency spectrum in the case of scanning the image of the object projected on the optical filter. For ideal multiple signal transmission, the frequency spectrum of the multiple signal must be selected such as shown in FIG. 1 in which a cut off frequency of the luminance signal (Y) is $\omega_m$ and the center frequencies of the red and blue color signals are $2\omega_m$ and $4\omega_m$ respectively, the abscissa representing the frequency and the ordinate the spectrum intensity.

Figure 1:
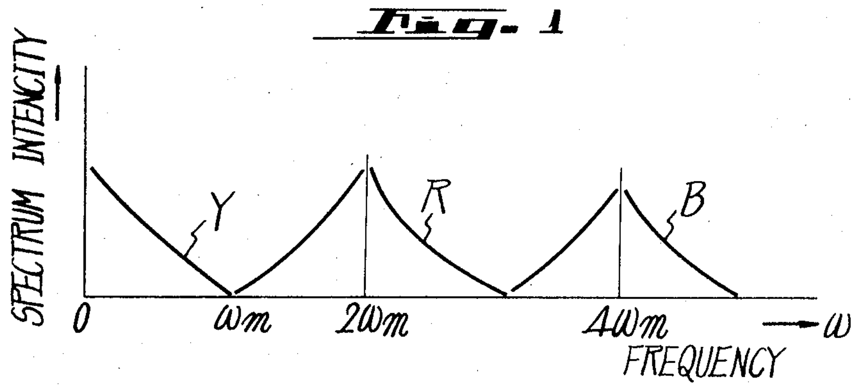
FIG. 1 is a graph showing an ideal distribution of a multiple signal of a frequency separating type camera, for explaining this invention.
Figure 2:
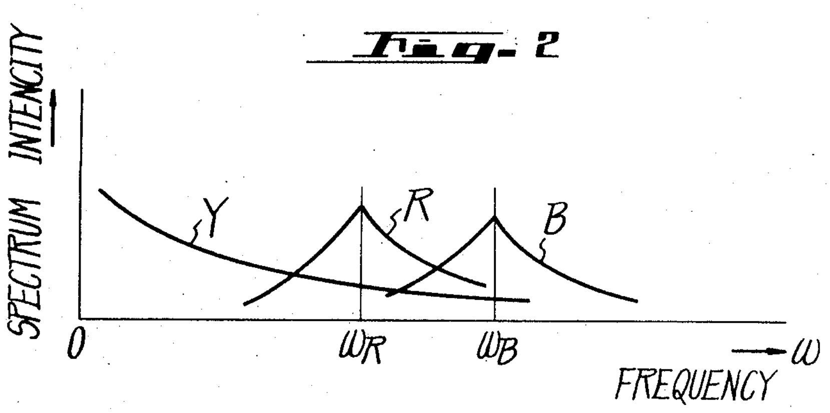
FIG. 2 is a graph illustrating an actual distribution of the spectrum of the multiple signal in which crosstalk is caused between adjacent channels.
Figure 3:
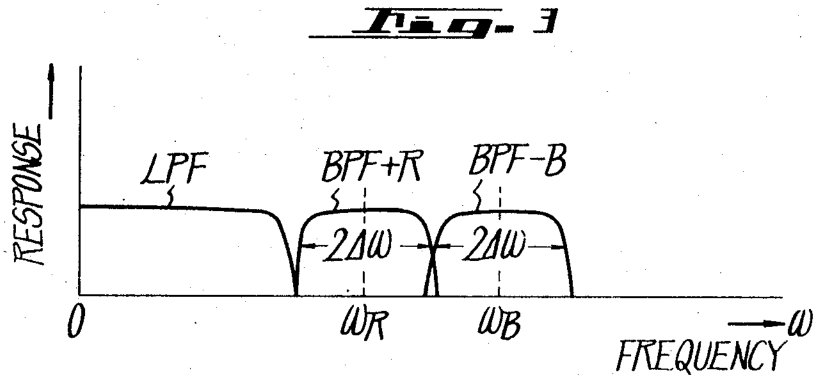
FIG. 3 is a graph showing the pass band characteristics of multiple signal separating filters.

However, such an ideal multiple signal transmission as shown in FIG. 1 is impossible because of a limit in the frequency characteristic of the camera tube including the optical path from the optical modulation surface formed by the aforementioned optical filter to the camera tube. Accordingly, multiplication of the signal in the transmissible band of the camera tube can be achieved by removing higher frequency components of the luminance signal Y and the red and blue signals R and B with an optical filter before they are subjected to optical modulation. In this case, it is necessary that the luminance signal Y is cut off at its higher frequency band much greater than those of the red and blue color signals. However, in the absence of an optical filter suitable for such a purpose, crosstalk occurs between adjacent ones of the luminance signal Y and the red and blue color signals R and B. The frequency spectrum of the multiple signal in such a case is shown in FIG. 2, in which the ordinate represents spectrum intensity and the abscissa frequency. The separation of the luminance signal Y and the red and blue color signals R and B is achieved by the employment of a filter made up of one low-pass filter and two band-pass filters which have such pass band characteristics as indicated by LPF, BPF-R and BPF-B in FIG. 3 respectively. In this case, the spectrum components of the adjacent channels are mixed as crosstalk to each filter, so that a spurious signal is produced by the crosstalk component after demodulation.

A brief description will be made in connection with the generation of the spurious signal in the case of an image of an object to be televised which includes an abrupt change from black to white.

Figure 4:
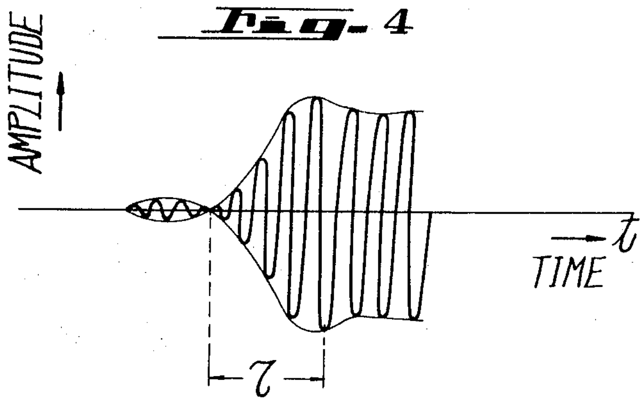
FIG. 4 is a waveform diagram showing a color signal derived from the color signal separating filter.
Figure 5:
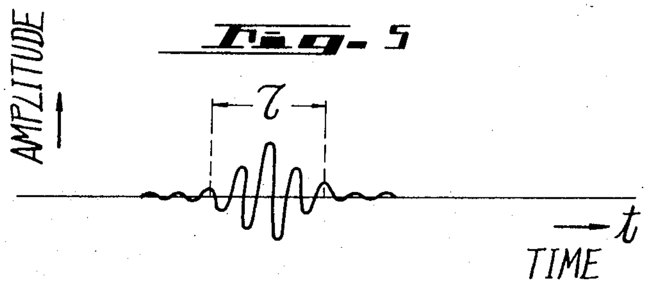
FIG. 5 is a waveform diagram showing a crosstalk component derived from the color signal separating filter.
Figure 6:
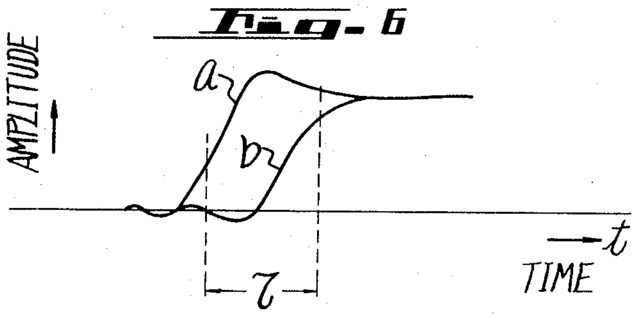
FIG. 6 is a waveform diagram of the color signal after being detected, showing a change of its rise time.

The waveform of the output derived from the color signal separating band-pass filter after such modulation as above described is as shown in FIGS. 4 and 5 in which the abscissa represents time and the ordinate amplitude. FIG. 4 shows the signal waveform of its rising portion $\tau$ in the absence of crosstalk and FIG. 5 the waveform of the crosstalk component contained in the rising portion $\tau$ of the signal waveform. Accordingly, the overall output waveform in the case of crosstalk being caused is the sum of the waveforms of FIGS. 4 and 5. In this case, the phase of the crosstalk in FIG. 5 is determined by the time of the color change in the image of the object, while the phase of the signal waveform of FIG. 4 is determined by that of arrangement of the strip filter elements of the optical filter. Accordingly, the phases of the waveforms shown in FIGS. 4 and 5 vary from 0 to $\pi$ with the relative phase of the marginal portion of the image of the object to the optical filter. That is, when the both waveforms are in-phase they are added to each other and in the opposite case they are subtracted from each other. Consequently, the signal produced by detecting the output of the color signal separating filter varies in its rising point as depicted in FIG. 6 at *a* and *b*, in which the ordinate represents amplitude and the abscissa time.

Figure 7:
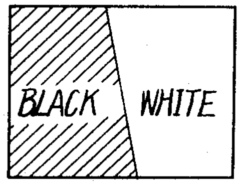
FIG. 7 is a diagram showing one of the pictures of an object which picture produces a spurious signal.
Figure 8:
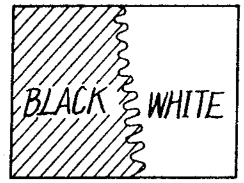
FIG. 8 is its reproduced picture.

Accordingly, when the relative phase of the image portion of a great color change to that of arrangement of the strip filter elements of the optical filter varies at every scanning, the rising point of a signal after being demodulated changes greatly to produce a spurious signal. In this case, such a reproduced picture as shown in FIG. 8 is displayed on the screen of a television receiver. FIG. 7 illustrates the original image of the object of an abrupt change in color from black to white. FIG. 8 shows a picture which is reproduced after being transmitted in accordance with the frequency separation system and which includes a zigzag portion 1 caused by the spurious signal produced for the above reason.

Figure 9:
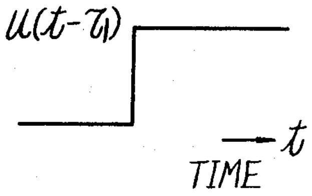
FIGS. 9 and 10 show a step function waveform and its frequency spectrum respectively.
Figure 10:
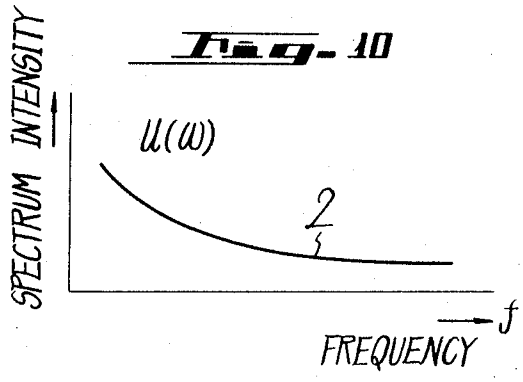
Figure 11:
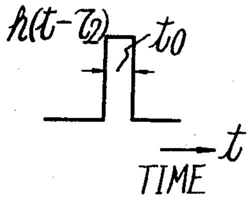
FIGS. 11 and 12 illustrate a rectangular pulse and its frequency spectrum respectively.
Figure 12:
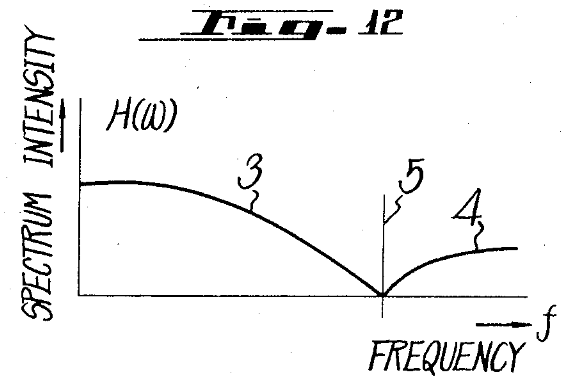

Generally, a signal of so wide frequency spectrum as to cause crosstalk has a waveform of an abrupt change which is usually a step function $u(t - \tau_1)$ waveform such as depicted in FIG. 9. The frequency spectrum of such a signal is as shown in FIG. 10 in which the ordinate represents spectrum intensity and the abscissa frequency. FIG. 11 shows a rectangular pulse. By a suitable selection of the width $t_0$ of the rectangular pulse, the spectrum of the rectangular pulse function $h(t-\tau_2)$ in the pass band of the color signal separating filter can be made substantially equal to that of the step function $u(t - \tau_1)$. If one of the center frequencies (equal to a carrier frequency) of the color signal separating filter is taken as $f_1$, the pulse width $t_0$ must be selected such that $t_0 = 1/2f_1$ so as to satisfy the above condition. This will hereinbelow be discussed in detail with reference to FIGS. 9 to 12. In the case of substituting the spectrum 3 of FIG. 12 for that 2 of FIG. 10, the former does not correspond to the latter because of the presence of the portion 4 and the point 5 of the spectrum being zero must be shifted to as high a frequency band as possible. Therefore, the point 5 is required to be shifted to a frequency band higher than the center frequency $f_1$ of the color signal separating filter. To this end, in the present invention the pulse width is selected such that $t_0 = 1/2f_1$. This is a first parameter. A second parameter is the phase of the rectangular pulse and this may be such that $\tau_1 = \tau_2$. Namely, a prediction pulse is produced at the edge of the image of the object being televised. In practice, the luminance signal is applied to a differentiation filter to provide a differentiated signal, which is shaped in waveform to produce a position detecting pulse and a prediction signal is produced based thereon.

A third parameter is the amplitude of the prediction pulse, which is correlative to the value of the high-frequency component of the signal, that is, the degree of change in color of the image of the object being televised. In practice, the position detecting pulse is shaped into a pulse of the pulse width $t_0$ and the differentiated waveform of the luminance signal is sampled with the pulse and the pulse amplitude-modulated can be used as a prediction signal which satisfies the aforementioned condition. The prediction pulse is applied to a filter having a transmission characteristic equal to that of the color signal separating band-pass filter and the waveform of the output therefrom is equal to that shown in FIG. 5 and by subtracting the output from that of the color signal separating filter, a spurious signal can be removed.

The foregoing has described the crosstalk between the non-carrier signal and the carrier signal. This will be described in detail with reference to FIG. 13. Reference numeral 6 indicates an image pickup tube including an optical strip filter or an optical system of the frequency separation system. The output from the pickup tube 6 is applied to a low-pass filter 7 and two delay circuits 10 and 11 through two band-pass filters 8 and 9. The outputs from the delay circuits 10 and 11 are fed to subtracting circuits 12 and 13 and the outputs from the low-pass filter 7 and the subtracting circuits 12 and 13 are supplied to a mixer 14 to derive red, green and blue color signals R, G and B therefrom. While, the luminance signal component contained in the output from the image pickup tube 6 is added to a detecting filter 15, in which the step function $u(t-\tau_1)$ is replaced with the rectangular pulse function $h(t-\tau_2)$ by a differentiation circuit included in the detecting filter 15. Accordingly, a pulse 24 is produced at the leading edge of a luminance signal 23 and shaped by a pulse shaping circuit 16 to provide a pulse 25 of a pulse width $t_0 = 1/2f_1$ and the shaped pulse 25 is sampled by the pulse 24 in a sampling circuit 17 to produce an amplitude-modulated prediction pulse 26 which is correlative to the degree of change in color of the image of the object being televised. The pulse 26 is applied to the subtracting circuits 12 and 13 through suitable amplifier circuits 18 and 19 and band-pass filters 20 and 21 having the same transmission characteristics as those of the aforementioned band-pass filters 8 and 9 respectively. In the subtracting circuits 12 and 13 the pulses from the band-pass filters 20 and 21 are subtracted from the signal components including crosstalk components which are derived from the delay circuits 10 and 11, thereby to remove the spurious signal produced by the non-carrier signal in the carrier.

Figure 14:
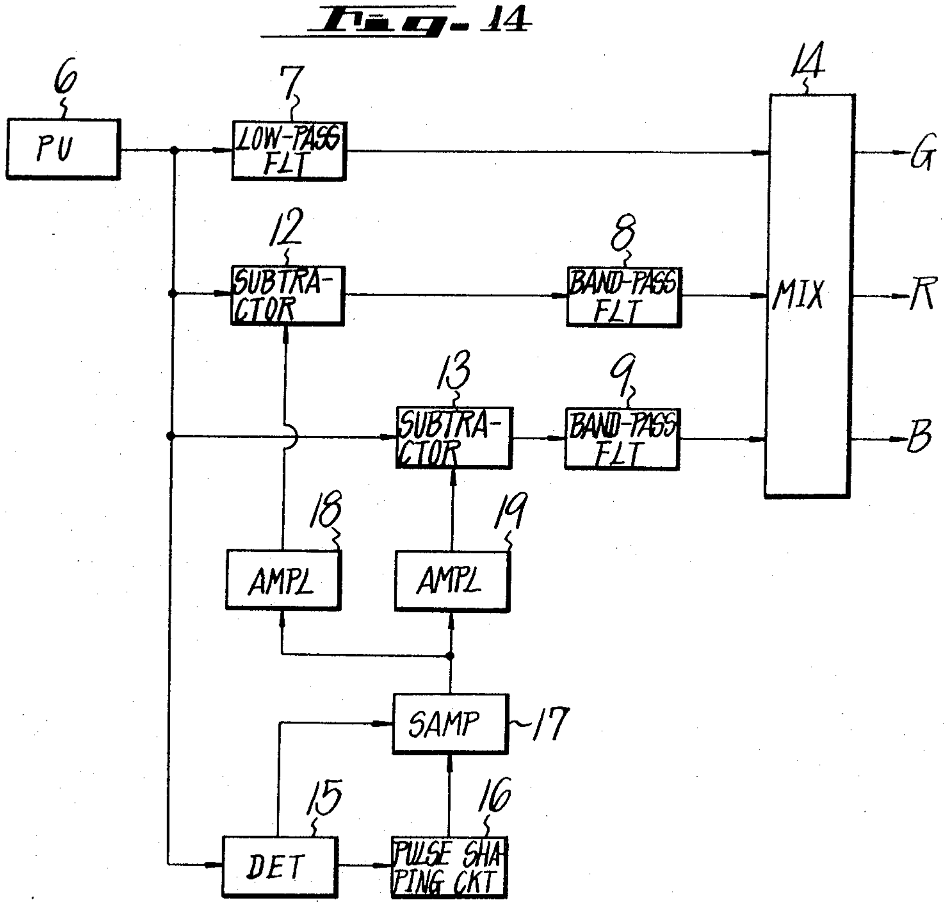
FIGS. 14 to 16 are block diagrams illustrating other examples of this invention.

FIG. 14 illustrates another example of this invention, which is of the type that the amplitude-modulated prediction pulse is subtracted from the composite signal of the camera output and then applied to a color signal separating filter and with which the same results as those in the foregoing example are obtainable. This example dispenses with the band-pass filters 20 and 21 and the delay circuits 10 and 11 which are employed in the foregoing example.

Figure 17:
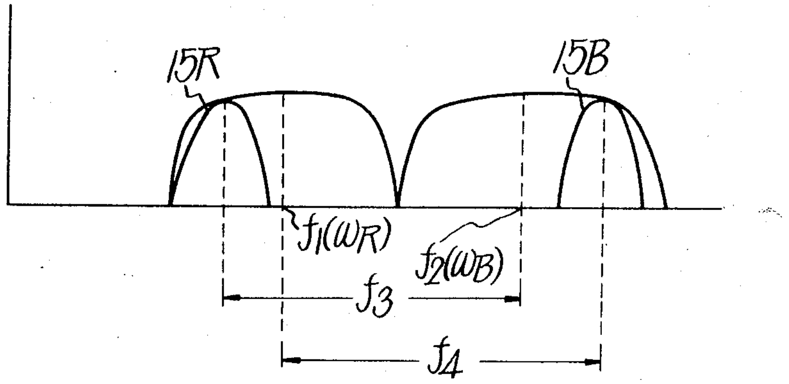
FIG. 17 is a diagram showing the frequency characteristic of a detecting filter.

The foregoing description has been made in connection with the method of removal of the spurious signal which is generated due to crosstalk between the non-carrier signal and the carrier signal. The following will describe a method of removal of a spurious signal produced by crosstalk between carrier signals of adjacent channels. As is the case with the foregoing example, a prediction pulse of wide spectrum is produced from a position detecting pulse and applied to filters equivalent to two color signal separating band-pass filters and the outputs therefrom are subtracted from respective color signal outputs. In this case, however, the pulse phase which is the second parameter cannot be detected from the luminance signal and it is necessary to derive it from detecting filters provided in respective carrier color signal paths. The circuit construction for this purpose will be described with reference to FIG. 15. Reference numerals 6 to 26 indicate the same elements as those in FIG. 13. In the present example the carrier signal component in the output from the image pickup tube 6 is applied to detecting filters 15R and 15B having such pass band widths as depicted in FIG. 17, thereby to substitute the step function $u(t-\tau_1)$ with the rectangular pulse function $h(t-\tau_2)$, namely to produce pulses 24R and 24B at the leading edge of the signal component 23. The pulses 24R and 24B are shaped by pulse shaping circuits 16R and 16B to provide pulses 25R and 25B having pulse widths $tR = 1/2f_3$ and $tB = 1/2f_4$ respectively. The pulses 25R and 25B are sampled by the pulses 24R and 24B in sampling circuits 17R and 17B to provide amplitude-modulated prediction pulses 26R and 26B which are correlative to the degree of change in color of an object being televised. The pulses 26R and 26B applied to the aforementioned amplifiers 18 and 19 are subtracted from the signal components including crosstalk components which are derived from the delay circuits 10 and 11, thereby removing a spurious signal produced by crosstalk between the carrier signals.

Figure 16:
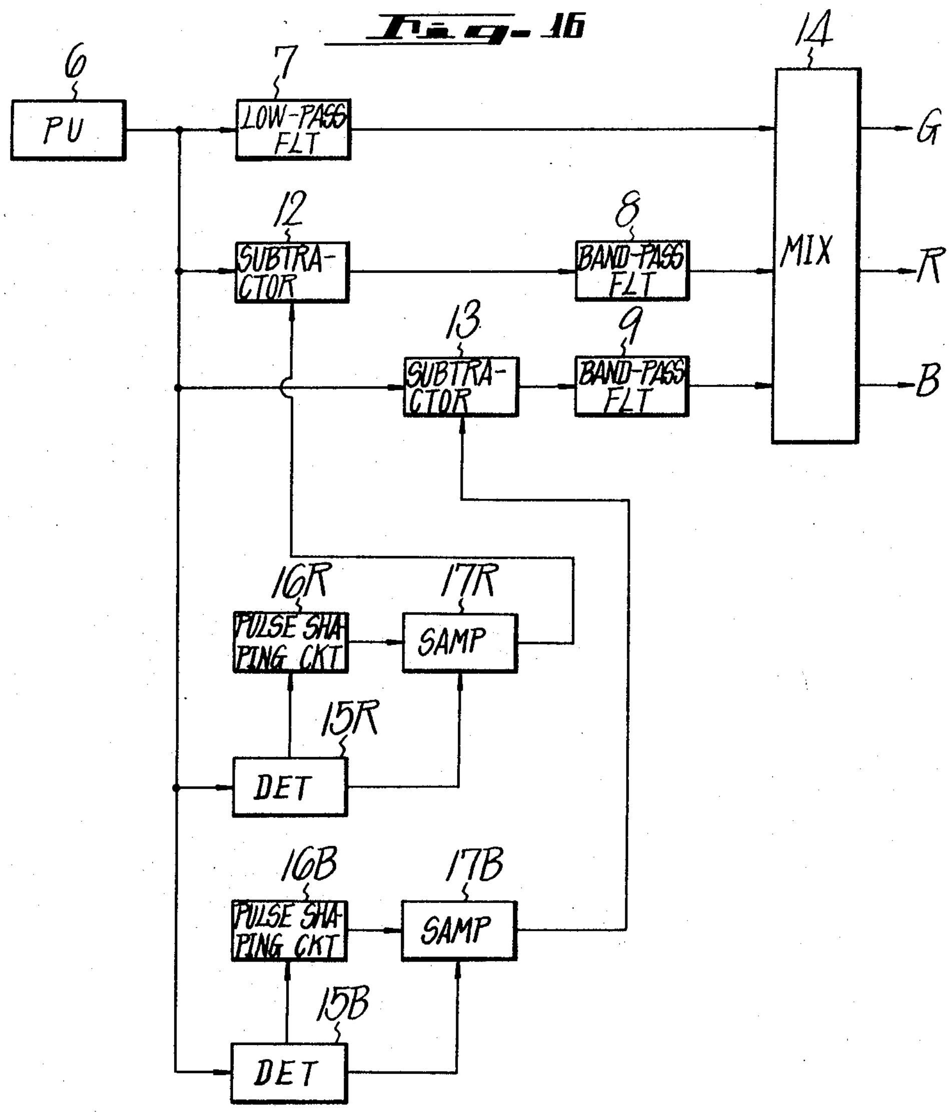

FIG. 16 illustrates another example of this invention, in which an amplitude-modulated prediction pulse is subtracted from the composite signal of the camera output and then applied to a color signal separating filter. The present example also does not require the band-pass filters and the delay circuits as is the case with the example of FIG. 14, and hence is advantageous.

Figure 13:
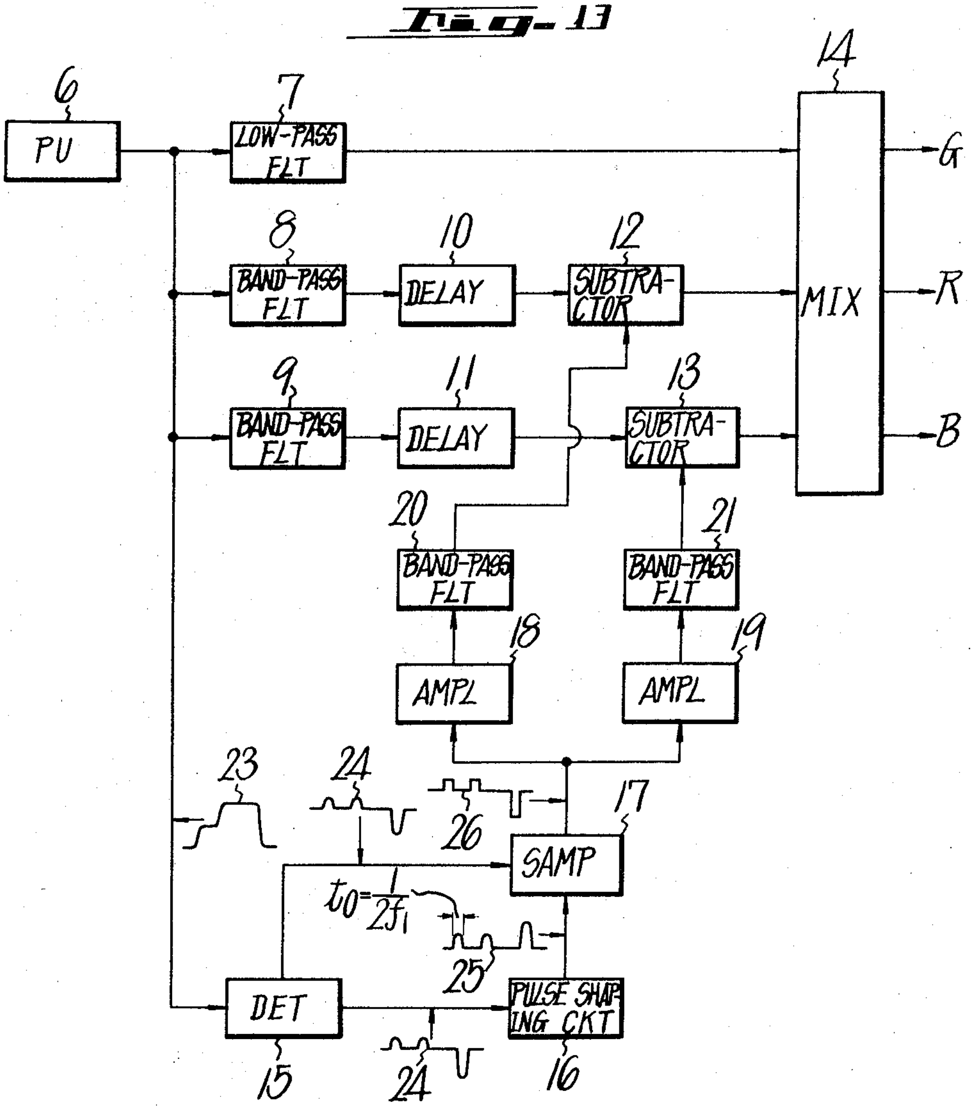
FIG. 13 is a block diagram illustrating one example of this invention.
Figure 15:
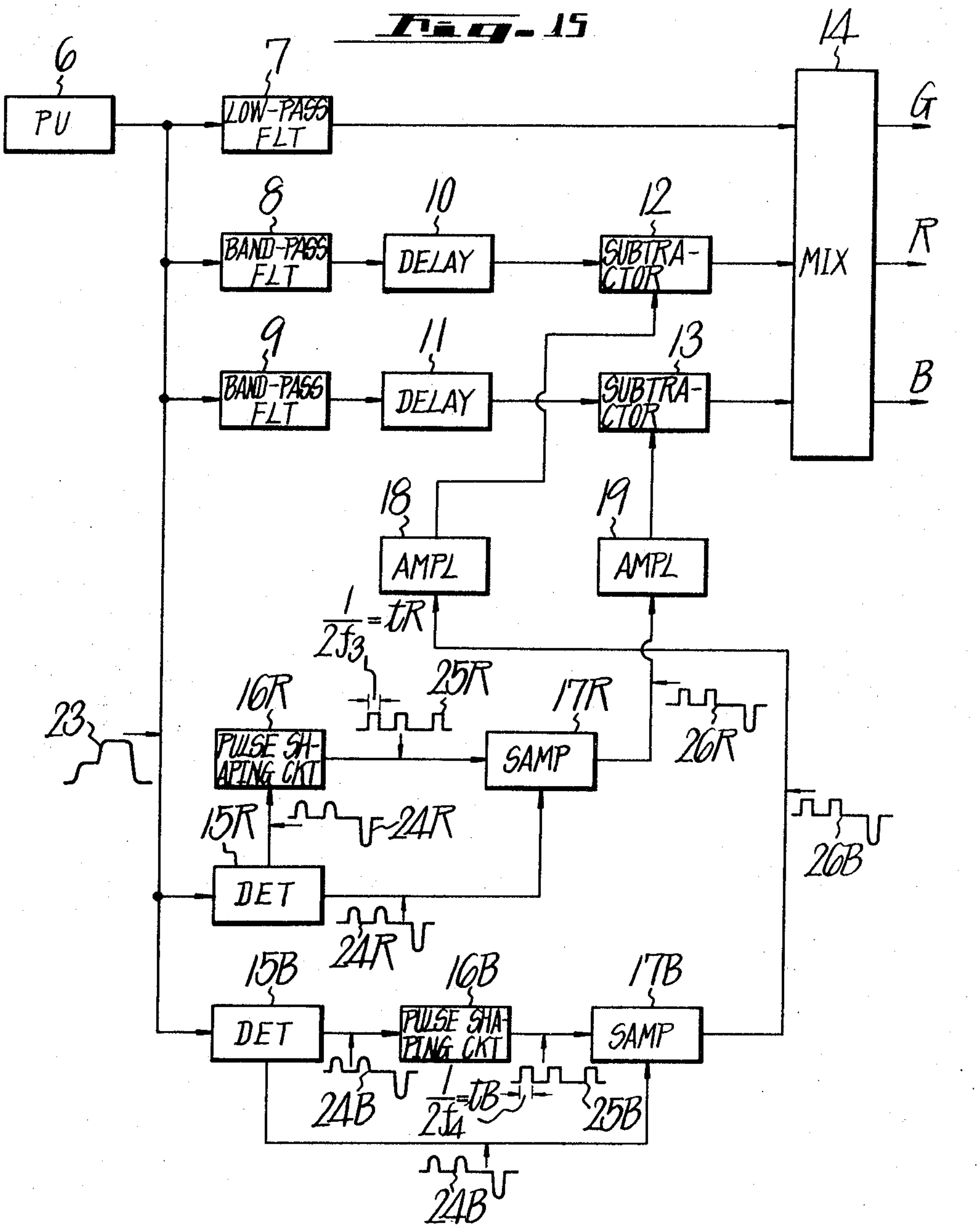
Figure 18:
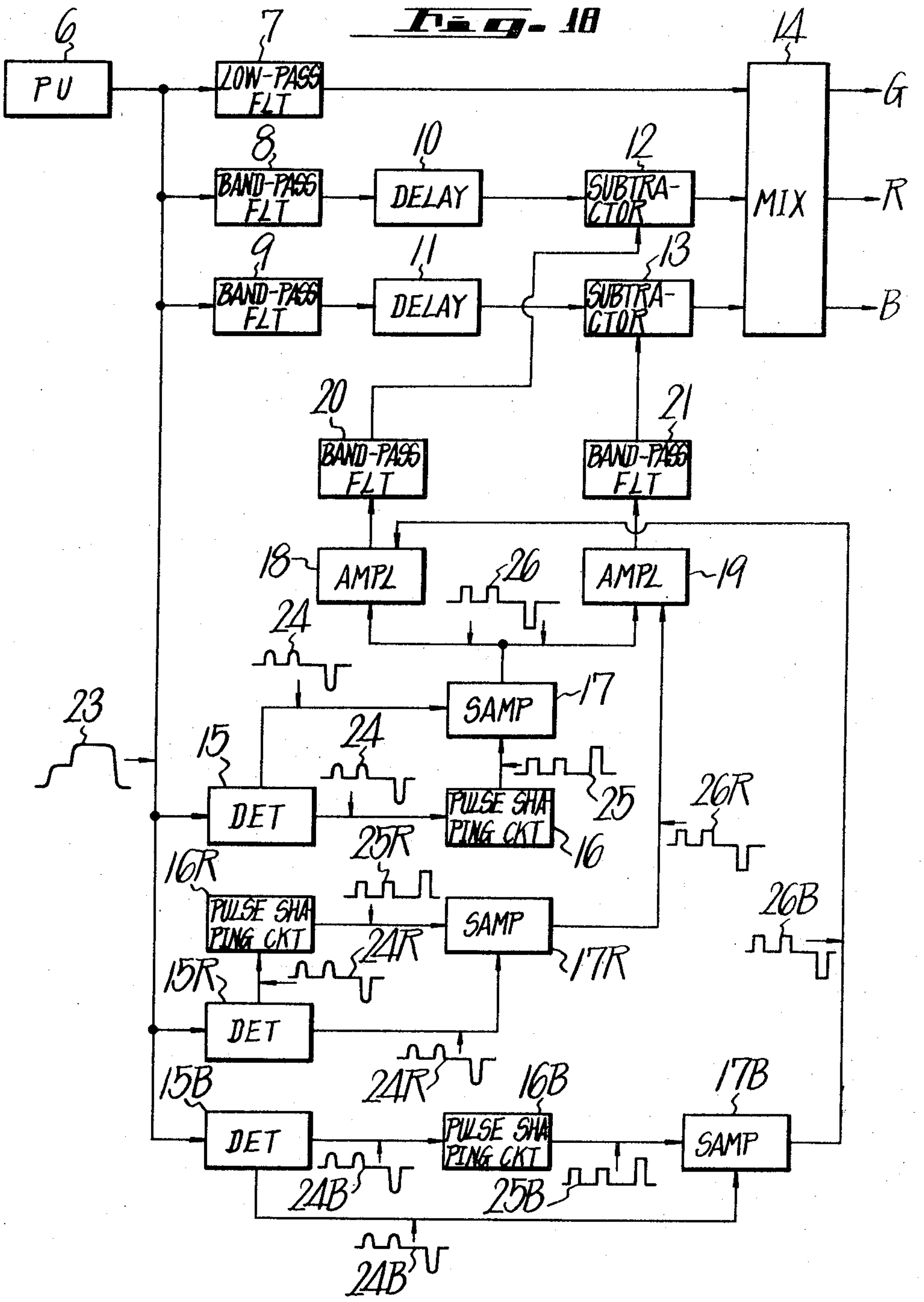
FIGS. 18 and 19 are block diagram showing another example of this invention.
Figure 19:
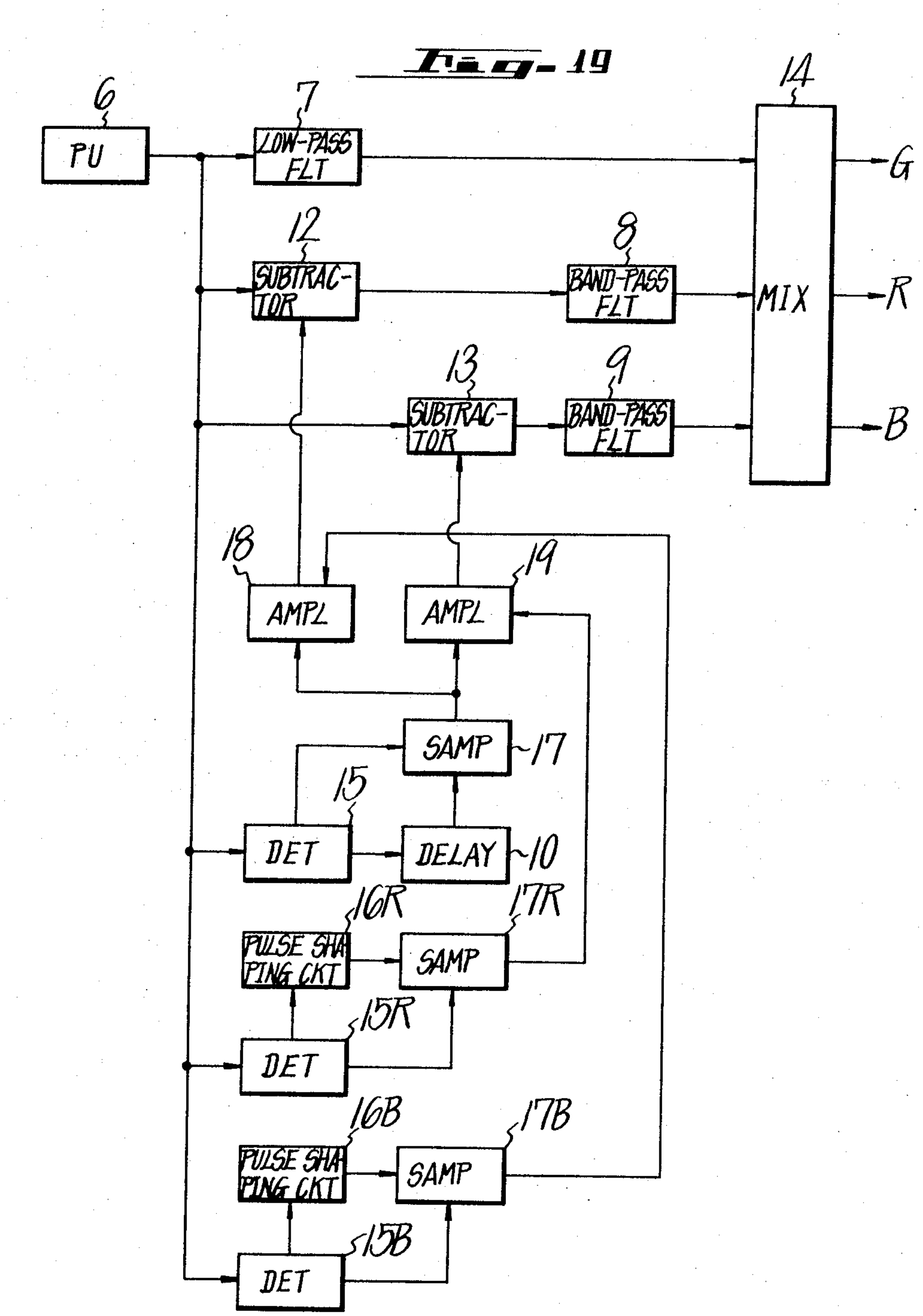

Further, it will be seen that spurious signals caused by crosstalk between the carrier signals and between the carrier signal and the non-carrier signal can be removed by the use of such circuit constructions as shown in FIGS. 18 and 19 which are obtained by the combination of the circuit constructions of FIGS. 13 and 15 and those of FIGS. 14 and 16 respectively.

The following description will be given of another example of the spurious signal removing means. A position detecting pulse (shown in FIG. 20B) is produced which is generated in the time $\tau$ in which the rising point of the color signal varies under the influence of the spurious signal as shown in FIG. 6 (FIG. 20A), namely at the edge of the image of the object where luminance abruptly changes. The edge portions of the red and blue carrier color signals where spurious signals are caused are gated with the position detecting pulse to cut off the color signals for the time during which the rising point of the color signal varies.

Figures 20A, 20B, 20C:
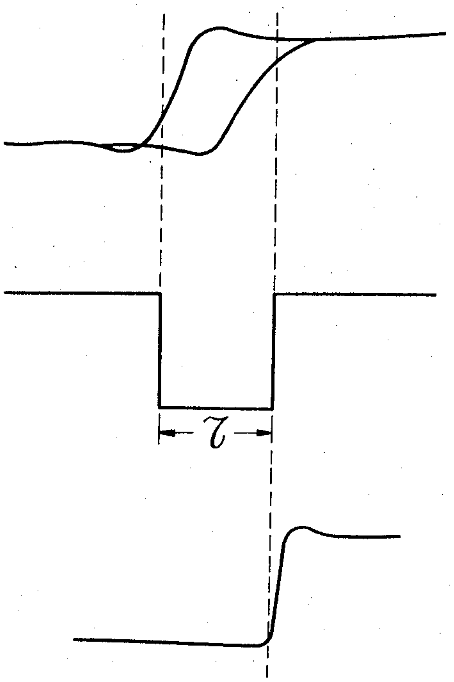
FIGS. 20A–20C and 21A–21Q are waveform diagrams for explaining this invention.

This is shown in FIG. 20C. As will be apparent from this figure, the spurious signal can be removed by gating the edge portion of the signal to cut off the signal. In this case, however, the composite signal corresponding to the time $\tau$ is composed of only the monochrome luminance signal and accordingly the color of that portion of the reproduced picture corresponding to the time $\tau$ is lost.

To avoid this, in the present invention the gate pulse having gated the edge portion of the color signal is amplitude-modulated with the color signal and then used as a substitute for the dropout portion of the color signal.

Figure 21A:
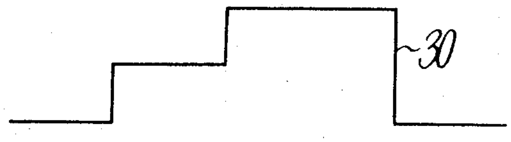
Figure 21B:
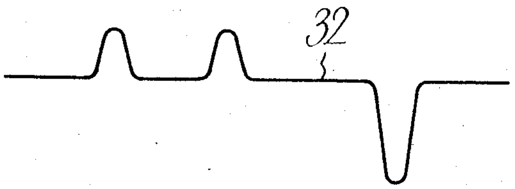
Figure 21C:
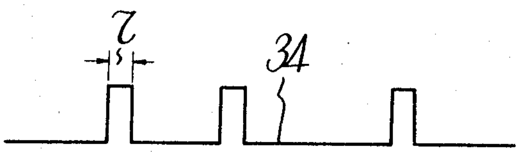
Figure 21D:
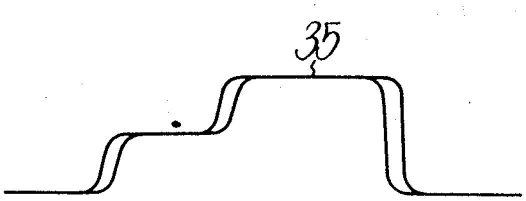
Figure 21E:
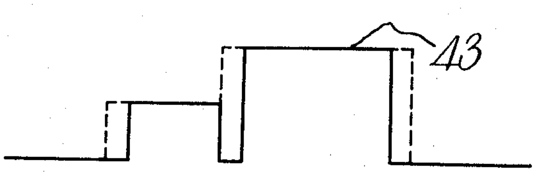

This will hereinbelow be described with reference to FIGS. 21 to 22. At first, a luminance signal 30 such as shown in FIG. 21A is differentiated by a differentiation circuit 31 to provide a differentiated pulse such as depicted in FIG. 21B. The differentiated pulse 32 is shaped by a pulse shaping circuit 33 to produce a positive pulse 34 such as shown in FIG. 21C which is of a constant pulse width ($\tau$ sec.) and a constant amplitude and which is used as a gate pulse. While, although the red and blue color signals are similar in waveform to the luminance signal, their rising and falling are dull due to the pass bands of the color signal separating filter and fluctuate under the influence of the spurious signal as indicated by 35 in FIG. 21D. The signal 35 is applied to a gate circuit 36 and removed by the gate pulse 34 of FIG. 21C to provide a signal 43 as depicted in FIG. 21E.

Figures 21F, 21G, 21H, 21I, 21J, 21K:
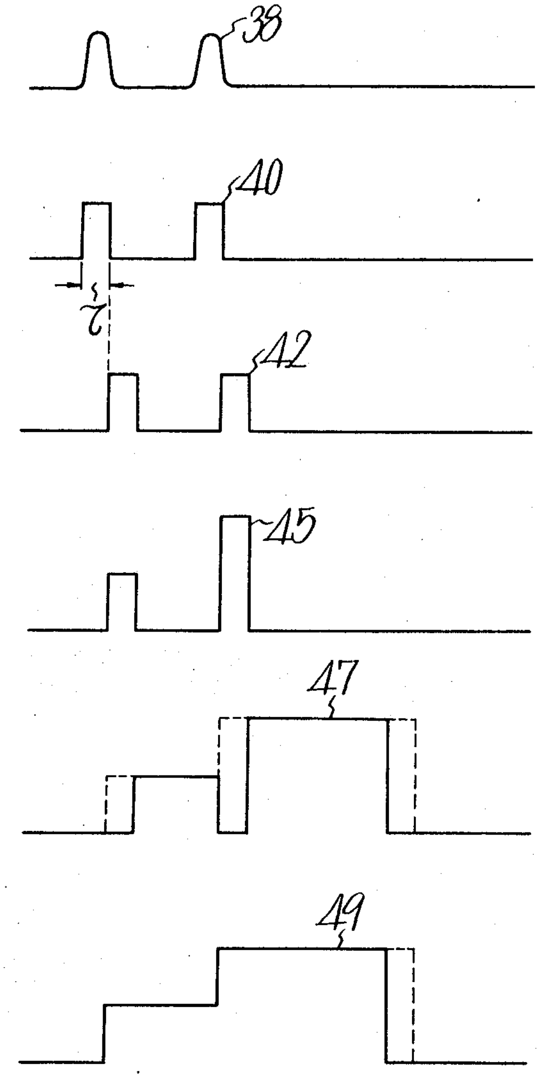
Figure 21L:
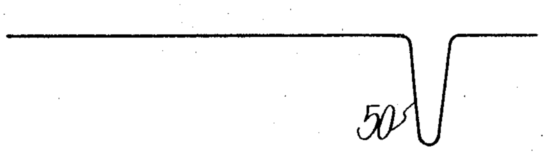
Figure 21M:
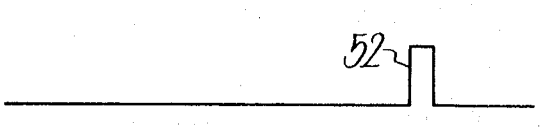
Figure 22:
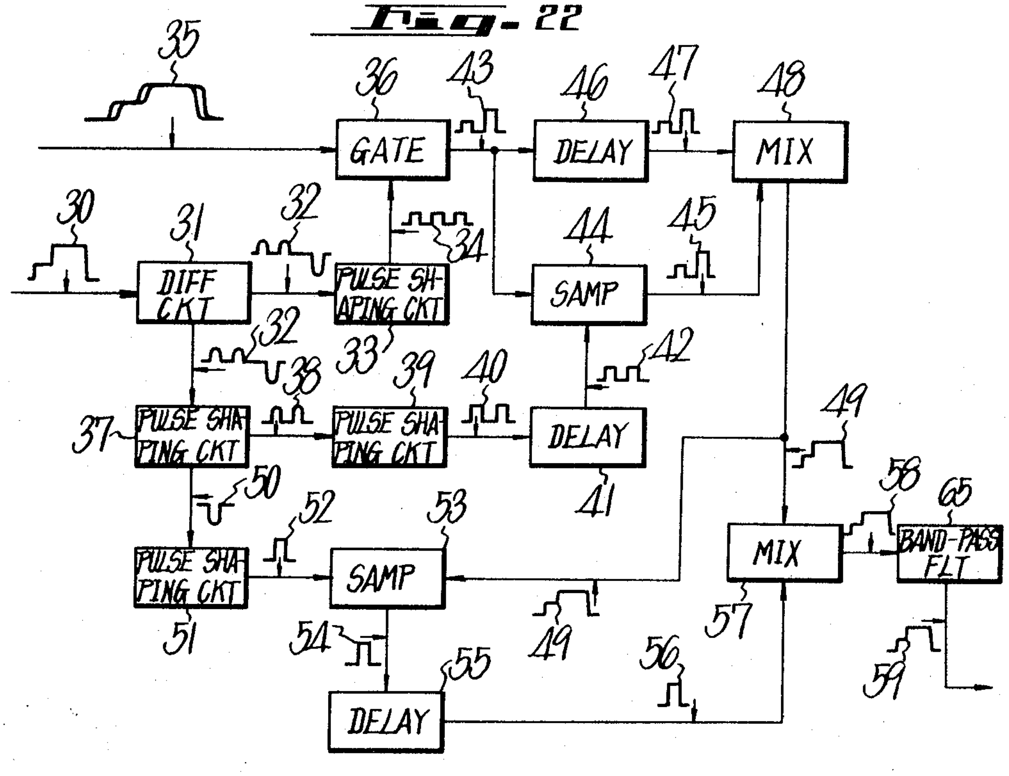
FIG. 22 is a block diagram showing one concrete connection of this invention system.

Then, the differentiated pulse 32 of FIG. 21B is applied to a pulse separator circuit 37 to obtain only a positive pulse 38 depicted in FIG. 21F, which is supplied to a shaping circuit 39 to provide a pulse 40 such as shown in FIG. 21G which is constant both in pulse width and in amplitude. The pulse 40 is fed to a delay circuit 41 to be delayed by the pulse width ($\tau$ sec.) to produce a pulse 42 such as depicted in FIG. 21H. The delayed pulse 42 is fed to a sampling circuit 44 to sample the gated color signal 43 of FIG. 21E, obtaining an amplitude-modulated pulse 45 such as depicted in FIG. 21I. Then, the color signal 43 is applied to a delay circuit 46 to be delayed by $\tau$ (sec.) to provide a signal 47 such as shown in FIG. 21J. The signal 47 and the pulse 45 are applied to a mixer 48 to obtain a signal 49 such as depicted in FIG. 21K whose rising portion has been corrected. While, the differentiated pulse 32 of FIG. 21B is supplied to the pulse separator circuit 37 to derive only a negative pulse 50 therefrom, which is shaped by a negative pulse shaping circuit 51 to provide a positive pulse 52 such as shown in FIG. 21M which is constant both in pulse width and in amplitude.

Figure 21N:
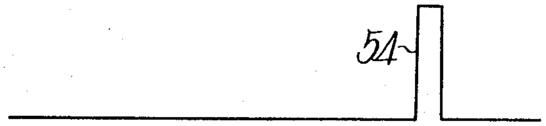
Figure 21O:
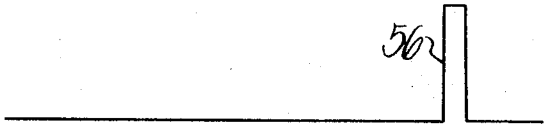
Figure 21P:
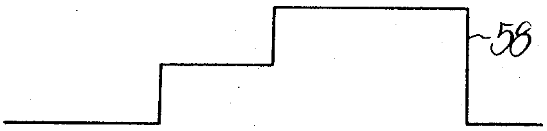
Figure 21Q:
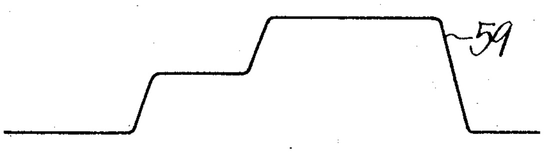
Figure 23:
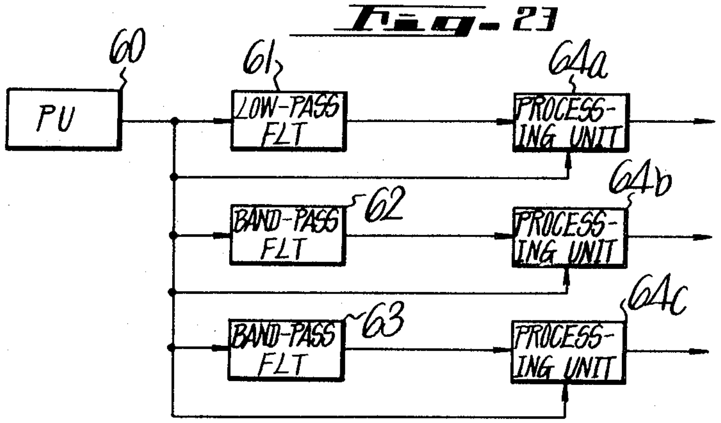
FIG. 23 is a block diagram illustrating a camera apparatus to which this invention is applied.

The pulse 52 is applied to a sampling circuit 53 to sample the signal 49 of FIG. 21K to provide an amplitude-modulated positive pulse 54 of the width $\tau$ (sec.) such as shown in FIG. 21N. This is positive pulse 54 is delayed $\tau$ (sec.) by a delay circuit 55 to produce a pulse 56 depicted in FIG. 210. The pulse 56 and the signal 49 are supplied to a mixer 57 to derive therefrom a signal 58 such as shown in FIG. 21P which is a color signal of correct rising and falling. Finally, the color signal 58 is applied to a low-pass filter 65 to limit the band of the color signal, thus providing such a color signal 59 as shown in FIG. 21Q. The foregoing operations are repeated for each of the red, green and blue color signals. As shown in FIG. 23, a low-pass filter 61 and two band-pass filters 62 and 63 are connected to the output of an image pickup tube 60 and processing units **64*a* to 64*c*, each incorporating the means shown in FIG. 22**, are connected to the filters.

As has been described in the foregoing, this invention effectively eliminates the crosstalk interference.

It will be apparent that many modifications and variations may be effected without departing from the scope of the novel concepts of this invention.

I claim as my invention:

1. A circuit for improving the quality of a television signal derived by a color camera tube so as to eliminate cross talk comprising, a detector filter including a differentiator receiving the luminance signal from said camera tube and producing an output pulse, a pulse-shaper circuit receiving the output of said detector filter and producing a pulse with time width equal to $1/2f_1$, where $f_1$ is the center frequency of a color separating filter, a sampler receiving the output of said filter detector and said pulse shaper circuit to produce an amplitude-modulated prediction pulse, a low pass filter receiving an output of said camera tube, a first subtractor receiving an output of said sampler, a mixer receiving the output of said low pass filter, a second subtractor receiving an output of said sampler, a first band pass filter and said first subtractor connected between said camera tube and said mixer, a second band pass filter and said second subtractor connected between said camera tube and said mixer.

2. A circuit for improving the quality of a television signal according to claim 1 wherein said first and second band pass filters are ahead of said first and second subtractors.

3. A circuit for improving the quality of a television signal according to claim 2 including first and second delay means respectively connected between said first and second band pass filters and subtractors.

4. A circuit for improving the quality of a television signal according to claim 1 including a third band pass filter connected between said sampler and said first subtractor, and a fourth band pass filter connected between sampler and said second subtractor.

5. A circuit for improving the quality of a television signal derived by a color camera tube so as to eliminate cross talk comprising, a low pass filter receiving an output of said camera tube, a mixer receiving the output of low pass filter, a first band pass filter, a first subtractor connected in series with said first band pass filter between said camera tube and said mixer, a second band pass filter, a second subtractor connected in series with said second band pass filter between said camera tube and said mixer, a first detector filter including a differentiator receiving an output of said camera tube and producing a pulse, a first pulse-shaping circuit receiving the output of said first detector, a first sampler supplying an output to said first subtractor and receiving inputs from said first detector filter and from said first pulse-shaping circuit, a second detector filter including a differentiator receiving an output of said camera tube and producing a pulse, a second pulse-shaping circuit receiving the output of said second detector filter, and a second sampler supplying an output to said second subtractor and receiving inputs from said second detector filter and said second pulse-shaping circuit.

6. A circuit for improving the quality of television signal according to claim 5 including first and second delay means respectively connected in series with said first band pass filter and said first subtractor and said second band pass filter and said second subtractor.

7. A circuit for improving the quality of television signal according to claim 6 including a third detector filter receiving an output of said camera tube, a third pulse-shaping circuit receiving the output of said third detector, a third sampler receiving inputs from said third detector and said third pulse-shaper circuit and supplying inputs to said first subtractor.

* * * * *